United States Patent
Kobayashi et al.

(10) Patent No.: US 11,429,784 B2
(45) Date of Patent: Aug. 30, 2022

(54) RESPONSE SENTENCE GENERATION DEVICE, RESPONSE SENTENCE GENERATION METHOD, AND PROGRAM

(71) Applicant: NIPPON TELEGRAPH AND TELEPHONE CORPORATION, Tokyo (JP)

(72) Inventors: Nozomi Kobayashi, Tokyo (JP); Kuniko Saito, Tokyo (JP); Junji Tomita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 148 days.

(21) Appl. No.: 17/040,524

(22) PCT Filed: Mar. 27, 2019

(86) PCT No.: PCT/JP2019/013403
§ 371 (c)(1),
(2) Date: Sep. 22, 2020

(87) PCT Pub. No.: WO2019/189489
PCT Pub. Date: Oct. 3, 2019

(65) Prior Publication Data
US 2021/0004543 A1    Jan. 7, 2021

(30) Foreign Application Priority Data

Mar. 27, 2018    (JP) ................. 2018-060790

(51) Int. Cl.
*G10L 15/00*    (2013.01)
*G06F 40/20*    (2020.01)
(Continued)

(52) U.S. Cl.
CPC .............. *G06F 40/20* (2020.01); *G06F 40/56* (2020.01); *G10L 15/02* (2013.01); *G10L 15/22* (2013.01);
(Continued)

(58) Field of Classification Search
CPC combination set(s) only.
See application file for complete search history.

(56) References Cited

FOREIGN PATENT DOCUMENTS

| JP | 2016-76117 | 5/2016 |
|---|---|---|
| JP | 2017-91368 | 5/2017 |
| WO | 2016151700 A1 | 9/2016 |

OTHER PUBLICATIONS

Fukuda, Takuya, "A Statistical Backchannel Response Extraction Method from Twitter Data in a Chatting System," Artifical Intelligence Society Journal, 33 vol. 1, DSH-H (2018).
(Continued)

*Primary Examiner* — Vu B Hang

(57) ABSTRACT

To make it possible to generate a response sentence with respect to an input speech sentence without preparing a large amount of data.

A response-type determining unit 117 determines, based on an analysis result of a speech sentence analyzed by a speech-content analyzing unit 112, a speech type indicating a type of the speech sentence and determines a response type with respect to the determined speech type based on the speech type and a type conversion rule prescribing, for each speech type, a rule for a response type with respect to a speech of the speech type. A response-sentence generating unit 119 generates the response sentence based on the response type and a response sentence database.

20 Claims, 9 Drawing Sheets

(51) Int. Cl.
*G06F 40/56* (2020.01)
*G10L 15/02* (2006.01)
*G10L 15/22* (2006.01)
*G10L 15/26* (2006.01)
*G10L 13/08* (2013.01)
*G06F 40/268* (2020.01)

(52) U.S. Cl.
CPC ............ *G06F 40/268* (2020.01); *G10L 13/08* (2013.01); *G10L 15/26* (2013.01)

(56) References Cited

OTHER PUBLICATIONS

Takayuki, Hasegawa, et al., "Prediction and arousal of listeners' emotions in online dialogue," Artificial Intelligence Society Journal, 29 vol. 1, SP1-J (2014).

Fig. 2

| APPEARING NOTATION | PART OF SPEECH | END FORM |
|---|---|---|
| CLAUSE INFORMATION: 0 1D 0/0 | | |
| ATAMA (HEAD) | NOUN | |
| CLAUSE INFORMATION: 1 -1O 0/1 | | |
| ITA | ADJECTIVE STEM | ACHES |
| I | ADJECTIVE SUFFIX: END | |

Fig. 3

| APPEARING NOTATION | PART OF SPEECH | END FORM |
|---|---|---|
| CLAUSE INFORMATION: 0 1D 0/1 | | |
| ANTA (YOU) | NOUN: PRONOUN | |
| NANKA | COMPOUND PARTICLE | |
| CLAUSE INFORMATION: 1 -1O 0/0 | | |
| KIRAI (HATE) | NOUN: ADJECTIVE | |

Fig. 4

| APPEARING NOTATION | PART OF SPEECH | END FORM |
|---|---|---|
| CLAUSE INFORMATION: 0 1D 1/2 | | |
| ○○ (PERSON NAME) | NOUN: PECULIAR: FAMILY NAME | |
| SAN | NOUN SUFFIX: NOUN | |
| NANKA | COMPOUND PARTICLE | |
| CLAUSE INFORMATION: 1 -1O 0/0 | | |
| KIRAI (HATE) | NOUN: ADJECTIVE | |

Fig. 5

| NOTATION | LABEL |
|---|---|
| SHIKUSHIKU (SOB SOB) | NEG/SADNESS |
| WAAI (YAY!) | POS/HAPPINESS |
| ARIGATOU (THANK YOU) | THANKS |
| BAKA (STUPID) | ABUSIVE |
| ⋮ | ⋮ |

Fig. 6

| END FORM | LABEL |
|---|---|
| ITAI (ACHE) | N_STATE |
| MUKATSUKU (DISGUSTED) | NEG/ANGER |
| KAWAII (CUTE) | POS |
| YOI (GOOD) | POS |
| DAMARE (SHUT UP) | ABUSIVE |
| KIRAI (HATE) | NEG/DISGUST |
| ⋮ | ⋮ |

Fig.7

| LABEL | EXPLANATION |
|---|---|
| NEG | negative EVALUATION |
| POS | positive EVALUATION |
| N_STATE | UNDESIRABLE STATE |
| P_STATE | DESIRABLE STATE |
| N_ACT | UNDESIRABLE ACT |
| P_ACT | DESIRABLE ACT |

| LABEL | EXPLANATION |
|---|---|
| ANGER | EXPRESSION REPRESENTING ANGER |
| SADNESS | EXPRESSION REPRESENTING SADNESS |
| DISGUST | EXPRESSION REPRESENTING DISGUST |
| SURPRISE | EXPRESSION REPRESENTING SURPRISE |
| HAPINESS | EXPRESSION REPRESENTING HAPPINESS |

| LABEL | EXPLANATION |
|---|---|
| THANKS | EXPRESSION REPRESENTING THANKS |
| APOLOGIZE | EXPRESSION REPRESENTING APOLOGY |
| CONGRATULATION | EXPRESSION REPRESENTING CONGRATULATION |
| WELCOME | EXPRESSION REPRESENTING WELCOME |
| ACCEPT | EXPRESSION REPRESENTING ACCEPTANCE |
| REJECT | EXPRESSION REPRESENTING REJECTION |
| ABUSIVE | ABUSIVE EXPRESSION |

Fig. 8

| NOTATION | LABEL |
|---|---|
| MEMORIAL DAY | EVENT |
| ×× ( ADULT ) | NG |
| ⋮ | ⋮ |

Fig. 9

| SPEECH TYPE | CONDITION | RESPONSE TYPE |
|---|---|---|
| N_ACT | REQUEST | WHY,SURPRISE |
| NEG | YOU | SADNESS |
| NEG | | WHY |
| REQUEST | | ACCEPT |
| POS | COMPLETION | BC_P:PAST |
| N_STATE | | BC_N |
| ⋮ | | ⋮ |

Fig. 10

| RESPONSE TYPE | RESPONSE SPEECH |
|---|---|
| DEFAULT | SOU NANDESUNE, NARUHODO (REALLY, INDEED) |
| SURPRISE | E? (HUH?) |
| SADNESS | SHIKUSHIKU ..., KANASHII DESU (SOB SOB ..., I'M SAD) |
| WHY | DOU SHITANDESUKA? (WHAT IS THE MATTER?) |
| BC_N | ARARA ... (OH DEAR...) |
| BC_P | IIDESUNE (NICE) |
| BC_P:PAST | YOKATTA DESUNE (THAT'S GREAT) |

Fig. 11

| LABEL | DESCRIPTION |
|---|---|
| WHY | EXPRESSION ASKING REASON FOR SPEECH |
| BC_N | CHIMING IN TO Negative |
| BC_P | CHIMING IN TO Positive |
| EMPATHY | EXPRESSION REPRESENTING SYMPATHY TO PARTNER |

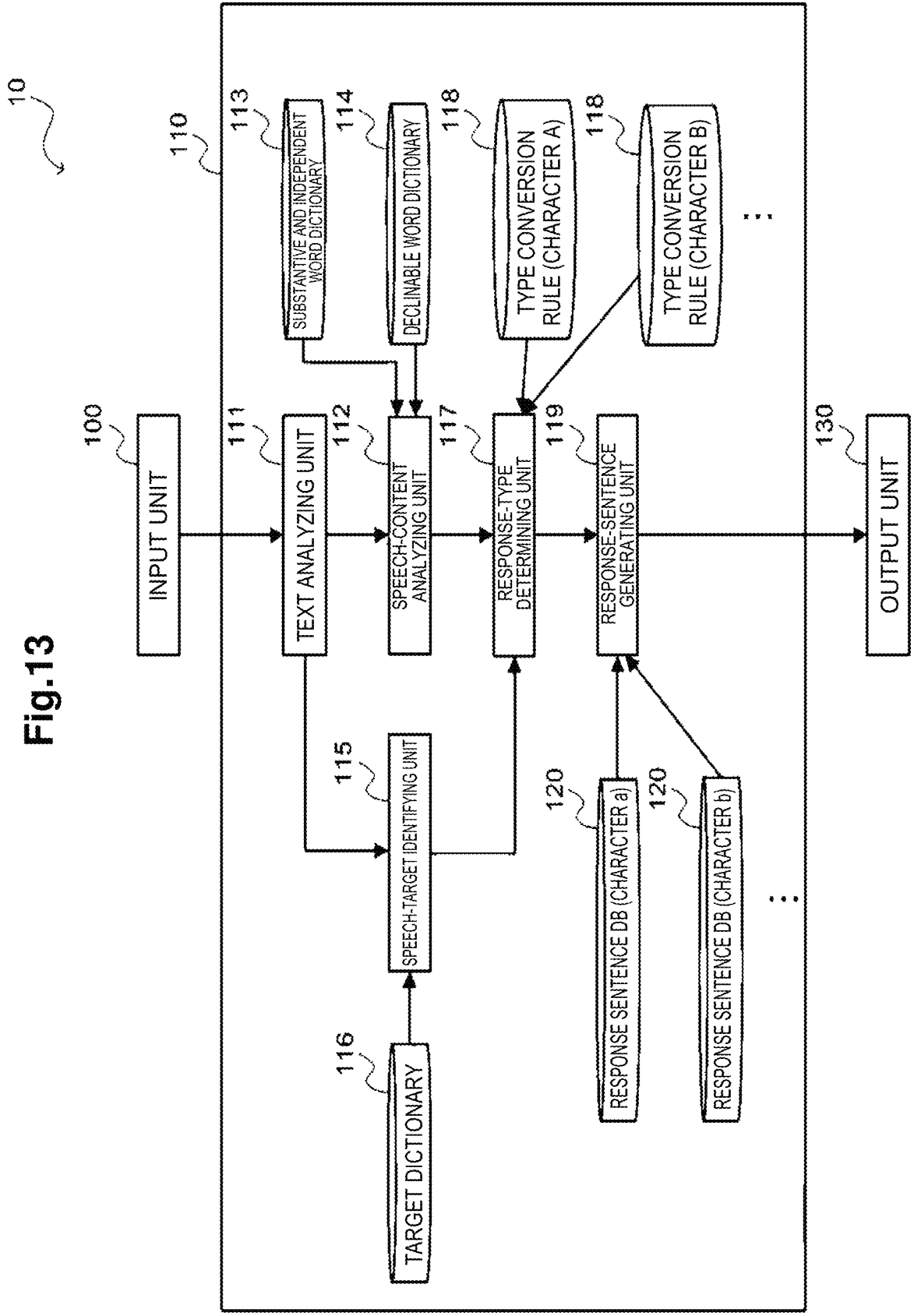

RESPONSE SENTENCE GENERATION DEVICE, RESPONSE SENTENCE GENERATION METHOD, AND PROGRAM

CROSS-REFERENCE TO RELATED APPLICATIONS

This application is a U.S. 371 Application of International Patent Application No. PCT/JP2019/013403, filed on 27 Mar. 2019, which application claims priority to and the benefit of JP Application No. 2018-060790, filed on 27 Mar. 2018, the disclosures of which are hereby incorporated herein by reference in their entireties.

TECHNICAL FIELD

The present invention relates to a response sentence generating device, a response sentence generating method, and a program and, more particularly, to a response sentence generating device, a response sentence generating method, and a program for generating a response sentence with respect to an input speech sentence.

BACKGROUND ART

In a chat dialog system, a "backchannel (a short reaction of a listener with respect to a conversation of a partner)" can inform that the listener is listening to and understanding a talk of the partner. The backchannel is effective for smoothing communication.

Under such a background, there has been proposed a method of generating a response sentence including not only typical "chiming in" such as "yes" and "yeah" but also short speeches such as "certainly" and "I agree" (Non-Patent Literature 1).

In Non-Patent Literature 1, a response sentence is generated by extracting a speech and a reply to the speech from a social networking service (SNS) in which short sentences are contributed, setting the replay as a response candidate sentence, and determining strength of a link between the speech and the response candidate sentence, backchannel likelihood of the response candidate sentence, and the like.

For example, when a user speaks "shut up", the backchannel is different depending on a character such as a character that apologizes saying "I'm sorry . . . " or a character that rejects saying "no".

These characteristics tend to appear in, in particular, a response to an emotional speech of the user. There has been proposed a method of predicting an emotion of a user and generating a speech that arouses the emotion (Non-Patent Literature 2).

CITATION LIST

Non-Patent Literature

Non-Patent Literature 1: Takuya Fukuda, Kei Wakabayashi, "Statistical backchannel response extracting method from Twitter data in a chat system", Transactions of the Japanese Society for Artificial Intelligence Vol. 33 No. 1, 2018
Non-Patent Literature 2: Takayuki Hasegawa, Nobuyuki Kaji, Naoki Yoshinaga, Masashi Toyoda, "Prediction and arousing of an emotion of a listener in an online dialog", Transactions of the Japanese Society for Artificial Intelligence Vol. 29 No. 1, 2014

SUMMARY OF THE INVENTION

Technical Problem

However, since chiming in or a short response sentence to a speech of a user is different depending on a character of a system, there is a problem in that, to adapt a method based on a large amount of data described in Non-Patent Literature 1 to a plurality of characters, a larger amount of data is necessary.

The method described in Non-Patent Literature 2 can generate a speech sentence that arouses a certain emotion with respect to a certain speech. However, there is a problem in that a large amount of data is necessary in advance as in Non-Patent Literature 1

Further, when the method targets the SNS, since speeches of speakers of a plurality of different characters are included in the SNS, there is a problem in that the speeches are inconsistent.

The present invention has been devised in view of the points described above, and an object of the present invention is to provide a response sentence generating device, a response sentence generating method, and a program that can generate a response sentence with respect to an input speech sentence without preparing a large amount of data.

Means for Solving the Problem

A response sentence generating device according to the present invention is a response sentence generating device that generates a response sentence with respect to an input speech sentence, the response sentence generating device including: a text analyzing unit that analyzes the speech sentence; a response-type determining unit that determines, based on an analysis result of the speech sentence by the text analyzing unit, a speech type indicating a type of the speech sentence and determines a response type with respect to the determined speech type based on the speech type and a type conversion rule prescribing, for each the speech type, a rule for a response type indicating a type of a response sentence that should respond to a speech of the speech type; a response sentence database that stores, for each the response type, the response sentence of the response type; and a response-sentence generating unit that generates the response sentence based on the response type determined by the response-type determining unit and the response sentence database.

A response sentence generating method according to the present invention is a response sentence generating method used for a response sentence generating device including a response sentence database that stores, for each response type indicating a type of a response sentence that should respond, a response sentence of the response type, the response sentence generating device generating the response sentence with respect to an input speech sentence, the response sentence generating method including: a text analyzing unit analyzing the speech sentence; a response-type determining unit determining, based on an analysis result of the speech sentence by the text analyzing unit, a speech type indicating a type of the speech sentence and determining a response type with respect to the determined speech type based on the speech type and a type conversion rule prescribing, for each the speech type, a rule for the response type with respect to a speech of the speech type; and a response-sentence generating unit generating the response sentence based on the response type determined by the response-type determining unit and the response sentence database.

With the response sentence generating device and the response sentence generating method according to the present invention, the response sentence database that stores, for each response type indicating a type of a response sentence that should respond, the response sentence of the response type is included, the text analyzing unit analyzes a speech sentence, a response-type determining unit determines, based on an analysis result of the speech sentence by the text analyzing unit, a speech type indicating a type of the speech sentence and determines a response type with respect to the determined speech type based on the speech type and a type conversion rule prescribing, for each speech type, a rule for the response type with respect to a speech of the speech type, and the response-sentence generating unit generates the response sentence based on the response type determined by the response-type determining unit and the response sentence database.

In this way, a speech type indicating a type of a speech sentence is determined based on an analysis result of an analyzed speech sentence, a response type with respect to the determined speech type is determined based on the speech type and a type conversion rule prescribing, for each speech type, a rule for a response type with respect to a speech of the speech type, and a response sentence can be generated based on the response type and the response sentence database. Consequently, it is possible to generate a response sentence with respect to an input speech sentence without preparing a large amount of data.

The speech type of the response sentence generating device according to the present invention can indicate arising, manifestation, or a type of an arousing act, an intention, or determination of an emotion and a subjective evaluation represented by a speech sentence, and the type conversion rule can prescribe, for each the speech type, a response type indicating a type of a response returned to the arising, the manifestation, or the type of the arousing act, the intention, or the determination of the emotion and the subjective evaluation indicated by the speech type.

The response sentence generating device according to the present invention can further include a speech-content analyzing unit that extracts, based on the analysis result of the speech sentence analyzed by the text analyzing unit, a predicate type indicating a type of an expression representing content of the speech sentence and modality information of the speech sentence, and the response-type determining unit can determine, based on the predicate type and the modality information extracted by the speech-content analyzing unit, a speech type indicating a type of the speech sentence and determine, based on the speech type and the type conversion rule prescribing, for each the speech type, a rule for a response type indicating a type of a response sentence that should respond to a speech of the speech type, a response type with respect to the determined speech type.

One or more characters according to the present invention can be a plurality of characters, and the response sentence generating device can further include a character switching unit that switches a set character to another character when a predetermined condition is satisfied.

The response sentence generating device according to the present invention can further include a speech-target identifying unit that determines, based on the analysis result of the speech sentence analyzed by the text analyzing unit, a target label indicating about whom the speech sentence is spoken or to whom the speech sentence is spoken, and the response-type determining unit can determine, based on at least any one of tense information, polarity information, and voice information indicating passive or active extracted by the speech-content analyzing unit, the predicate type, the modality information, and the target label determined by the speech-target identifying unit, a speech type indicating a type of the speech sentence.

A program according to the present invention is a program for causing a computer to function as the units of the response sentence generating device.

Effects of the Invention

With the response sentence generating device, the response sentence generating method, and the program according to the present invention, it is possible to generate a response sentence with respect to an input speech sentence without preparing a large amount of data.

BRIEF DESCRIPTION OF DRAWINGS

FIG. 2 is a diagram showing an example 1 of an analysis result of a speech sentence by the response sentence generating device according to the embodiment of the present invention.

FIG. 3 is a diagram showing an example 2 of an analysis result of a speech sentence by the response sentence generating device according to the embodiment of the present invention.

FIG. 4 is a diagram showing an example 3 of an analysis result of a speech sentence by the response sentence generating device according to the embodiment of the present invention.

FIG. 5 is a diagram showing an example of a substantive and independent word dictionary of the response sentence generating device according to the embodiment of the present invention.

FIG. 6 is a diagram showing an example of a declinable word dictionary of the response sentence generating device according to the embodiment of the present invention.

FIG. 7 is a diagram showing an example of a label of the response sentence generating device according to the present invention.

FIG. 8 is a diagram showing an example of a target dictionary of the response sentence generating device according to the embodiment of the present invention.

FIG. 9 is a diagram showing an example of a type conversion rule of the response sentence generating device according to the embodiment of the present invention.

FIG. 10 is a diagram showing an example of a response sentence database of the response sentence generating device according to the embodiment of the present invention.

FIG. 11 is a diagram showing an example of a response type of the response sentence generating device according to the embodiment of the present invention.

FIG. 13 is a block diagram showing a configuration of a response sentence generating device according to another embodiment of the present invention.

DESCRIPTION OF EMBODIMENTS

Embodiments of the present invention is explained below with reference to the drawings.

<Configuration of Response Sentence Generating Device According to Embodiment of Present Invention>

Figure 1:
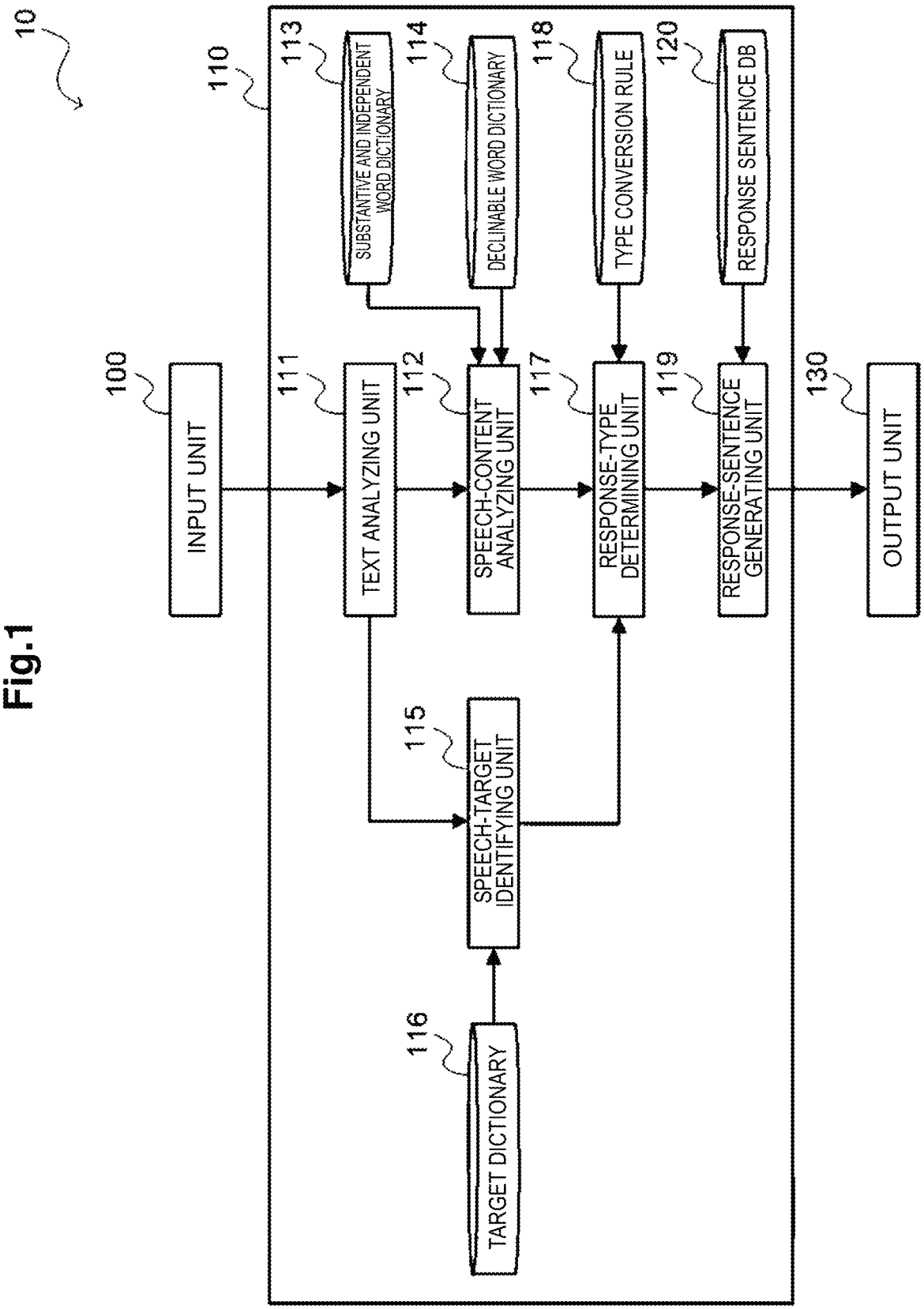
FIG. 1 is a block diagram showing a configuration of a response sentence generating device according to an embodiment of the present invention.

A configuration of a response sentence generating device 10 according to an embodiment of the present invention is explained with reference to FIG. 1. FIG. 1 is a block diagram showing the configuration of the response sentence generating device 10 according to the embodiment of the present invention.

The response sentence generating device 10 is configured by a computer including a CPU, RAM, and ROM storing a program for executing a response sentence generation processing routine explained below. In terms of functions, the response sentence generating device 10 is configured as explained below.

As shown in FIG. 1, the response sentence generating device 10 according to this embodiment includes an input unit 100, a computing unit 110, and an output unit 130.

The input unit 100 receives an input of a speech sentence. The speech sentence is not limited to a sentence input by a human and, for example, may be a sentence obtained by converting a human speech into a text through voice recognition or the like or may be a sentence generated by a robot or a chatbot.

The input unit 100 passes the received speech sentence to a text analyzing unit 111.

The computing unit 110 generates a response sentence with respect to an input speech sentence.

Specifically, the computing unit 110 includes the text analyzing unit 111, a speech-content analyzing unit 112, a substantive and independent word dictionary 113, a declinable word dictionary 114, a speech-target identifying unit 115, a target dictionary 116, a response-type determining unit 117, a type conversion rule 118, a response-sentence generating unit 119, and a response sentence database (DB) 120.

The text analyzing unit 111 analyzes a speech sentence received by the input unit 100.

Specifically, the text analyzing unit 111 performs a morpheme analysis, a syntactic dependency analysis, and peculiar expression extraction, which are known techniques, on the input speech sentence and analyzes morpheme information (a part of speech, an end form, and the like), syntactic dependency information, and peculiar expression information (a type of a peculiar expression).

Examples of analysis results are shown in FIG. 2 to FIG. 4. FIG. 2 is a diagram showing an analysis result concerning a speech sentence "atama ga itai (head aches)" (hereinafter, example 1). FIG. 3 is a diagram showing an analysis result about a speech sentence "anta nanka kirai (I hate you)" (hereinafter, example 2). FIG. 4 is a diagram showing an analysis result about a speech sentence "xxx-san nanka kirai (I hate . . . )" (hereinafter, example 3).

Clause information shown in FIG. 2 to FIG. 4 is information including information concerning "a clause ID, a modifiee clause ID/a modifying type, and a subject morpheme number/a function word morpheme number".

Note that, in an explanation in this embodiment, a definition of a peculiar expression conforms to IREX (URL: https://nlp.cs.nyu.edu/irex/index-j.html). However, the definition of the peculiar expression may be based on another peculiar expression system.

The text analyzing unit 111 passes the morpheme information, the syntactic dependency information, and the peculiar expression information, which are analysis results, to the speech-content analyzing unit 112 and the speech-target identifying unit 115.

The substantive and independent word dictionary 113 links and stores words, parts of speech of which are substantive and independent words such as "noun", "independent word", "interjection", and "exclamation" and labels. An example of the substantive and independent word dictionary 113 is shown in FIG. 5.

The declinable word dictionary 114 links and stores words, parts of speech of which are declinable words such as "verb stem", "adjective stem", and "noun: adjective (adjective verb)" and labels. An example of the declinable word dictionary 114 is shown in FIG. 6.

The labels of the substantive and independent word dictionary 113 and the declinable word dictionary 114 are abstracted forms of types of expressions concerning subjective evaluation, emotion, and arising, manifestation, and arousing act of emotion, and the like represented by the respective words.

The labels can be detailed labels including a plurality of labels using delimiters such as "/".

For example, in the examples shown in FIG. 5 and FIG. 6, when a plurality of labels are applicable to expressions representing a speech sentence such as a predicate, the labels are divided by the delimiters ("/") and created to be labels more in detail toward the back.

An example of labels is shown in FIG. 7. In the example shown in FIG. 7, in the left figure, labels indicating polarities of situations and evaluations (POS (positive)/NEG (negative) and substantive evaluations (desirable and undesirable)) are shown. In the center figure, labels indicating emotions are shown. In the right figure, labels indicating arising, manifestation, and arousing act of emotions (for example, expressions of typical conversational exchange including greeting) are shown.

The speech-content analyzing unit 112 extracts information for analyzing what a speech sentence describes. More specifically, the speech-content analyzing unit 112 extracts, based on the analysis result of the speech sentence analyzed by the text analyzing unit 111, tense information, polarity information and voice information indicating passive or active of the speech sentence, a predicate type indicating a type of an expression representing content of the speech sentence, and modality information of the speech sentence.

Specifically, the speech-content analyzing unit 112 extracts, from the morpheme information, the syntactic dependency information, and the peculiar expression information, which are the analysis results of the text analyzing unit 111, a predicate type, tense information, polarity information, voice information, and modality information indicating a type of an expression representing content of the speech sentence.

First, the speech-content analyzing unit 112 extracts expressions indicating content of the speech sentence such as a predicate and determines a predicate type using the substantive and independent word dictionary 113 and the declinable word dictionary 114. Among the expressions representing the content, an independent word and the like are not accurately predicates but are collectively referred to as predicates for convenience of explanation in this embodiment. A predicate can be extracted by extracting a subject of a last clause of a speech sentence.

Subsequently, the speech-content analyzing unit 112 performs determination of the predicate type. The speech-content analyzing unit 112 performs the determination of the predicate type by determining whether the speech sentence includes an expression present in the substantive and independent word dictionary 113 or the declinable word dictionary 114. When the expression is included, the speech-content analyzing unit 112 determines a label of a corresponding expression in the dictionary as the predicate type.

The speech-content analyzing unit 112 confirms a part of speech of the extracted predicate. If the part of speech is a "verb stem", an "adjective stem", or a "noun: adjective (adjective verb)", the speech-content analyzing unit 112 searches through the declinable word dictionary 114 with an end form and, if there is a matching word, determines a label of the matching word as the predicate type.

If the part of speech is "noun", "independent word", "interjection", or "exclamation", the speech-content analyzing unit 112 searches through the substantive and independent word dictionary 113 with a notation and, if there is a matching word, determines a label of the matching word as the predicate type.

For example, when the declinable word dictionary 114 is FIG. 6, in the case of the example 1, "itai (aches)" corresponds to a label "N_STATE" of the declinable word dictionary 114. In the case of the example 2 and the example 3, "kirai (hate)" corresponds to a label "NEG/DISGUST" of the declinable word dictionary 114.

When the speech sentence does not include an expression present in the substantive and independent word dictionary 113 or the declinable word dictionary 114, the speech-content analyzing unit 112 leaves the predicate type as blank and performs the following processing.

Subsequently, the speech-content analyzing unit 112 extracts a function word appearing after the notation of the predicate and extracts tense information (past), polarity information (affirmative and negative), voice information (passive, active, causative, and the like), and modality information (desire, intension, order, prohibition, and the like).

<<(A) Extraction of Tense Information>>

When a morpheme notation "ta" including "suffix: end" after a predicate is present, the speech-content analyzing unit 112 determines the tense information as "past". For example, if the speech sentence is "atamaga itakatta (head ached)", the tense information is "past".

<<(B) Extraction of Polarity Information>>

If a morpheme, an end form of which is a suffix "nai", "masen", "nu", or "zu" representing negation, is present after the predicate, the speech-content analyzing unit 112 determines the polarity information as "negative" and, otherwise, determines the polarity information as "affirmative". For example, if the speech sentence is "sukijanai (do not like)", the polarity information is "negative".

<<(C) Extraction of Voice Information>>

If a morpheme notation, an end form of which is "reru" or "rareru", is present after the predicate, the speech-content analyzing unit 112 determines the voice information as "passive". If a morpheme, an end form of which is "seru" or "saseru" is present, the speech-content analyzing unit 112 determines the voice information as "causative". Otherwise, the speech-content analyzing unit 112 determines the voice information as "active". For example, if the speech sentence is "tabesaserareta (caused to eat)", the voice information is "causative".

<<(D) Extraction of Modality Information>>

If a morpheme, an end form of which is "tai", is present after the predicate, the speech-content analyzing unit 112 determines the modality information as "desire". For example, if the speech sentence is "dokoka ikitai (want to go somewhere)", the modality information is "desire".

If a verb is an imperative form such as "siro (do)" or "kaere (go home)", the speech-content analyzing unit 112 determines the modality information as "order". If the predicate is a basic form of a verb and "na" is present immediately after the predicate, the speech-content analyzing unit 112 determines the modality information as "prohibition". For example, if the speech sentence is "shaberuna (do not speak)", the modality information is "prohibition".

If the predicate is a verb and a morpheme notation immediately after the predicate is "te", when any one of notations "kure", "kudasai", "itadaku", "chodai", "morau", "hosii", and "moraitai" follows or no following notation is present, the speech-content analyzing unit 112 determines the modality information as "request". For example, if the speech sentence is "hagemasite hosii (want to encourage me)", the modality information is "request".

The speech-content analyzing unit 112 passes the extracted predicate type, the extracted tense information, the extracted polarity information, the extracted voice information, and the extracted modality information to the response-type determining unit 117.

The speech-target identifying unit 115 determines, based on the analysis result of the speech sentence analyzed by the text analyzing unit 111, a target label indicating about whom the speech sentence is spoken or to whom the speech sentence is spoken.

Specifically, the speech-target identifying unit 115 performs (processing 1) extraction of a case and a term and performs (processing 2) determination of a target label from the morpheme information, the syntactic dependency information, and the peculiar expression information, which are the analysis results of the text analyzing unit 111. The extracted term represents "about whom" or "about what" described above. The extracted case is information indicating a semantic role (a syntactic relation, a place where an act is performed, an owner of an object, or the like) represented by the term.

In the following explanation, the extraction of the case and the term is performed by a rule-based method. However, the case and the term may be extracted using a predicate structure analysis technique (which may be a general technique). Note that the predicate structure analysis technique may also be used for the processing for extracting a predicate (an expression representing content of a speech) in the speech-content analyzing unit 112.

<<Processing 1>>

First, the speech-target identifying unit 115 confirms, from the analysis result of the text analyzing unit 111, whether a particle, a case particle, or a compound particle (hereinafter, case notation) is present in each clause. When the case notation is absent, if the clause is a clause immediately preceding the last and only a subject is present, the speech-target identifying unit 115 determines "case omission" (a label representing that the case notation is absent) as the case notation. For example, in the case of the example 1 ("atama ga itai (head aches)"), the case notation is the "case omission".

When the case notation is present or, even if the case notation is absent, when the clause is not the clause immediately preceding the last or a word other than the subject is present, the speech-target identifying unit 115 extracts continuation of nouns (including an unknown word, a suffix, and the like) before the case notation and determines the continuation of the nouns as the term notation, determines a term class according to the following rules, and determines the term class as the case notation.

<<Rule 1>>

If the term notation is noun continuation present in the notation of the target dictionary 116 (see FIG. 8) prepared in advance, a label linked to the notation is determined as the term class.

<<Rule 2>>

If the term notation is not registered in the target dictionary 116 and peculiar expression information is present, a class of the peculiar expression is determined as the term class.

<<Rules 3>>

If the term notation is an expression representing a second party such as "anata", "omae", "teme", or "anta", "YOU" is determined as the term class. If a system has a name, the name of the system may be included in this rule.

According to the rules, the speech-target identifying unit 115 extracts a [case notation: term class] pair. For example, in the case of the example 2, since the case notation is "nanka" and the term class is "YOU", the [case notation: term class] pair is [nanka: YOU]. In the case of the example 3, the [case notation: term class] pair is [nanka: PERSON]. Note that, although there is only one corresponding expression in the example 2 and the example 3, if there are a plurality of corresponding expressions, all the expressions are extracted.

If the term notation does not correspond to the rules 1 to 3, the term class is regarded as absent.

<<Processing 2>>

Subsequently, the speech-target identifying unit 115 determines a target label based on the extracted [case notation: term class] pair.

When the extracted [case notation: term class] pair is one pair, the speech-target identifying unit 115 determines a term notation of the pair as a target label. For example, in both of the example 2 and the example 3, since the extracted [case notation: term class] pair is one pair, the speech-target identifying unit 115 determines "YOU" and "PERSON" respectively as target labels.

When there are a plurality of [case notation: term class] pairs, the speech-target identifying unit 115 checks case notations in the following priority order and determines a term class of the case notation having the highest priority level as a target label.

[Priority order] is ga>wa>mo>tte>nanka>nante>wo>ni>de>e>nitsuite>others>case omission.

Priority ordering using the case notation is performed here. However, for example, when a target language is a language other than Japanese such as English, rules for the priority ordering only has to be described using cases in the language.

The target label is an abstracted form obtained by identifying about whom (what) the speech is spoken or to whom (what) the speech is spoken.

Note that, when the term class is absent, the target label is also absent.

The speech-target identifying unit 115 passes the determined target label to the response-type determining unit 117.

The target dictionary 116 links and stores a term notation and a label corresponding to the term notation. The label can be freely defined. For example, a peculiar expression label (a definition used in peculiar expression extraction), EVENT (an event name), and NG (an NG word such as a broadcast prohibited word) can be defined (FIG. 8).

The type conversion rule 118 is a type conversion rule decided for a specific character and used to convert a speech type into a response type.

Specifically, a type conversion rule including a set of a speech type, a condition, and a response type is described in the type conversion rule 118 (FIG. 9). Pluralities of conditions and response types can be described using delimiters such as a comma (","). Description of the speech type is essential. Description of the condition is optional.

Contents of the target label, the tense information, the polarity information, the voice information, and the modality information can be described in the condition. In this way, rules corresponding to the target label and the modality information can also be described in the condition. In that case, the target label and the modality information are described in the speech type.

The response-type determining unit 117 determines, based on at least any one of the tense information, the polarity information, and the voice information indicating passive or active of the speech sentence extracted by the speech-content analyzing unit 112, the predicate type, the modality information, and the target label determined by the speech-target identifying unit 115, a speech type indicating a type of the speech sentence and determines, based on the speech type and the type conversion rule 118 prescribing, for each speech type, a rule of a response type indicating a type of a response sentence that should respond to a speech of the speech type, a response type with respect to the determined speech type.

For example, the speech type indicates arising, manifestation, or a type of an arousing act, an intention, or determination of an emotion and a subjective evaluation represented by a speech sentence, and the type conversion rule prescribes, for each speech type, a response type indicating a type of a response returned with respect to the arising, the manifestation, or the type of the arousing act, the intention, or the determination of the emotion and the subjective evaluation indicated by the speech type.

Specifically, first, the response-type determining unit 117 determines a speech type according to the following rules.

<<Rule 1>>

When there is a predicate type, (1) when the polarity information is "negative" in POS or NEG, if the predicate type is POS, the predicate type is rewritten into NEG and, if the predicate type is NEG, the predicate type is rewritten into POS, and determined as the speech type, and (2), in a case other than (1) described above, the predicate type is determined as the speech type.

<<Rule 2>>

When the predicate type is blank, if the polarity information is affirmative and the modality information is present, the modality information is determined as the speech type.

<<Rule 3>>

If the predicate type does not correspond to the rules 1 and 2 described above and both of the predicate type and the modality information are blank, if a target label is present, the target label is determined as the speech type.

<<Rule 4>>

When the predicate type does not correspond to the rules 1 to 3 described above, the speech type is determined as "DEFAULT".

Subsequently, the response-type determining unit 117 searches through the type conversion rule 118 prepared in advance with the determined speech type.

When a detailed label is present in the speech type, the response-type determining unit 117 divides the detailed label with delimiters (in this embodiment, "/"), searches through the type conversion rule 118 in order from a label in the back (labels are more detailed toward the back), and stops the search at a point in time when a rule is found.

When a condition is present for rules, the response-type determining unit 117 adopts only a rule satisfying the condition and determines a response type of the rule as a determination result. When a rule with the condition is not satisfied, the response-type determining unit 117 adopts a rule without the condition and determines a response type of the rule as a determination result.

When a corresponding type conversion rule 118 is absent, the response-type determining unit 117 determines a response type of "DEFAULT" as a determination result.

For example, in the case of the example 1, the speech type is "N_STATE" and the tense information, the polarity information, the voice information, the modality information, and the target label are "none". In this case, the response-type determining unit 117 searches through the type conversion rule 118 shown in FIG. 9 with "N_STATE" and determines that the response type is "BC_N".

For example, in the case of the example 2, the speech type is "NEG/DISGUST", the tense information, the polarity information, the voice information, and the modality information are "none", and the target label is "YOU". In this case, even if the response-type determining unit 117 searches through the type conversion rule 118 shown in FIG. 9 with "DISGUST" first, the speech type is absent. Therefore, the response-type determining unit 117 searches through the type conversion rule 118 with "NEG". In the type conversion rule 118 for determining "NEG" as a speech type, a rule in which a condition "YOU" is present is adopted. The response-type determining unit 117 determines that the response type is "SADNESS".

In the case of the example 3, the speech type is "NEG/DISGUST", the tense information, the polarity information, the voice information, and the modality information are "none", and the target label is "PERSON". In this case, as in the example 2, in the type conversion rule 118 for determining "NEG" as a speech type, a rule matching the rule with the condition is absent. Therefore, a rule without the condition is adopted. The response-type determining unit 117 determines that the response type is "WHY".

The response-type determining unit 117 passes the response type, which is a determination result, to the response-sentence generating unit 119.

The response sentence DB 120 stores response sentences for each response type decided for a specific character. The response sentences includes a short response sentence as short as approximately ten characters with respect to a speech and a typical response sentence corresponding to the specific character or a specific situation.

An example of the response sentence DB 120 is shown in FIG. 10. As shown in FIG. 10, a database is a set of a pair of a response type and a response speech. A plurality of response speeches can be described using delimiters such as a comma (,).

The response-sentence generating unit 119 generates a response sentence based on the response type determined by the response-type determining unit 117 and the response sentence DB 120.

Specifically, the response-sentence generating unit 119 generates a response sentence based on the response type determined by the response-type determining unit 117 using the response sentence DB 120 prepared in advance.

The response-sentence generating unit 119 searches through the response sentence DB 120 with the input response type, acquires a response speech, and stores the response speech in a response speech candidate list (not illustrated). When the acquired response speech includes a plurality of response speeches, the response-sentence generating unit 119 divides the response speeches with delimiters and stores the response speech in the candidate list.

When a plurality of response types are present, the response-sentence generating unit 119 searches through the response sentence DB 120 with all the response types and stores response speeches in the response speech candidate list.

Subsequently, the response-sentence generating unit 119 selects one response speech out of the response speech candidate list at random and generates the selected response speech as a response sentence.

For example, in the example 1, since the response type is "BC_N", the response-sentence generating unit 119 searches through the response sentence DB 120 with "BC_N" and stores "arara . . . (oh dear . . . )" in the response speech candidate list. Since there is only one candidate, the response-sentence generating unit 119 generates "arara . . . (oh dear . . . )" as a response sentence.

For example, in the example 2, since the response type is "SADNESS", the response-sentence generating unit 119 searches through the response sentence DB 120 with "SADNESS", stores two response speeches "shikushiku . . . (sob sob)" and "kanasii desu (I'm sad)" in the response speech candidate list, and generates one of the response speeches (for example, "shikushiku . . . (sob sob)") as a response sentence.

In the example 3, since the response type is "WHY", the response-sentence generating unit 119 searches through the response sentence DB 120 with "WHY" and stores a response speech "dou shitandesuka? (what is the matter?)" in the response speech candidate list. Since there is only one candidate, the response-sentence generating unit 119 generates "dou shitandesuka? (what is the matter?)" as a response sentence.

The response-sentence generating unit 119 passes the generated response sentence to the output unit 130.

The output unit 130 outputs the response sentence generated by the response-sentence generating unit 119.

For example, in the case of the example 1, when the speech sentence "atama ga itai (head aches)" is input to the input unit 100, the output unit 130 outputs "arara . . . (oh dear . . . )".

For example, in the case of the example 2, when the speech sentence "anta nanka kirai (I hate you)" is input to the input unit 100, the output unit 130 outputs "shikushiku . . . (sob sob)".

In the case of the example 3, when the speech sentence "xxx-san nanka kirai (I hate . . . )" is input to the input unit 100, the output unit 130 outputs "dou shitandesuka? (what is the matter?)".

By using the type conversion rule 118 and the response sentence DB 120 in this way, it is possible to further reduce cost than when generating a response sentence with a large amount of learning data.

<Action of the Response Sentence Generating Device According to the Embodiment of the Present Invention>

Figure 12:
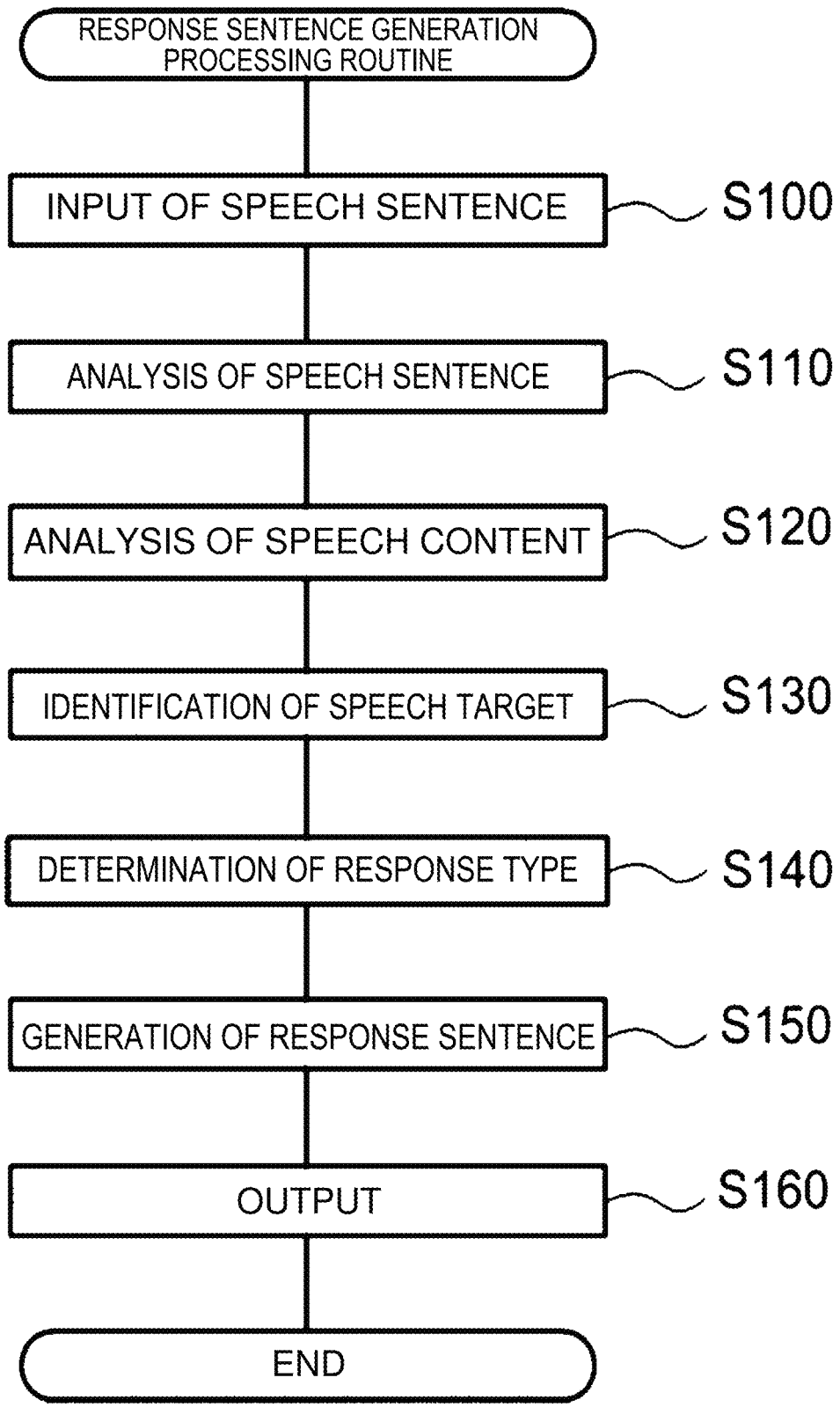
FIG. 12 is a flowchart showing a response sentence generation processing routine of the response sentence generating device according to the embodiment of the present invention.

FIG. 12 is a flowchart showing a response sentence generation processing routine according to the embodiment of the present invention.

When a speech sentence is input to the input unit 100, the computing unit 110 executes the response sentence generation processing routine shown in FIG. 12.

First, in step S100, the input unit 100 receives an input of a speech sentence.

In step S110, the text analyzing unit 111 analyzes the speech sentence received in step S100.

In step S120, the speech-content analyzing unit 112 extracts, based on an analysis result of the speech sentence analyzed in step S110, tense information, polarity information, and voice information indicating passive or active of the speech sentence, a predicate type indicating a type of an expression representing content of the speech sentence, and modality information of the speech sentence.

In step S130, the speech-target identifying unit 115 determines, based on the analysis result of the speech sentence analyzed in step S110, a target label indicating about whom the speech sentence is spoken or to whom the speech sentence is spoken.

In step S140, the response-type determining unit 117 determines, based on at least any one of the tense information, the polarity information, and the voice information indicating passive or active extracted in step S120, the predicate type, the modality information, and the target label determined in step S130, a speech type indicating a type of a speech sentence and determines a response type with respect to the determined speech type based on the speech type and the type conversion rule 118 prescribing, for each speech type, a rule of a response type indicating a type of a response sentence that should respond to a speech of the speech type.

In step S150, the response-sentence generating unit 119 generates a response sentence based on the response type determined in step S140 and the response sentence DB 120.

In step S160, the output unit 130 outputs the response sentence generated in step S150.

As explained above, with the response sentence generating device 10 according to the embodiment of the present invention, it is possible to determine, based on a predicate type and modality information extracted based on an analysis result of an analyzed speech sentence, a speech type indicating a type of a speech sentence, determine a response type with respect to the determined speech type based on the speech type and a type conversion rule prescribing, for each speech type, a rule of a response type with respect to a speech of the speech type, and generate, based on the response type and a response sentence database, a response sentence with respect to an input speech sentence without preparing a large amount of data in order to generate the response sentence.

Note that the present invention is not limited to the embodiment explained above. Various modifications and applications of the present invention are possible within a range not departing from the gist of the present invention.

In the embodiment, all the extracted information is passed to the response-type determining unit 117. However, a response type can be determined if there are at least the predicate type and the modality information. At least any one of the tense information, the polarity information, and the voice information indicating passive or active of the speech sentence, the predicate type indicating the type of the expression representing the content of the speech sentence, and the modality information of the speech sentence may be extracted. If there is more information of speech content passed to the response-type determining unit 117, a response type more suitable for the speech sentence is determined. Therefore, it is possible to generate a response sentence more suitable for the speech sentence at lower cost.

In the embodiment explained above, the type conversion rule 118 and the response sentence DB 120 are configured concerning one character. However, the type conversion rule 118 and the response sentence DB 120 can also be configured for each plurality of characters. That is, the response sentence generating device 10 includes a plurality of type conversion rules 118 corresponding to a plurality of characters and a plurality of response sentence DBs 120 corresponding to the plurality of characters (FIG. 13).

In this case, concerning each of the plurality of characters, the type conversion rule 118 can be configured to be the type conversion rule 118 for the character. Concerning each of the plurality of characters, the response sentence DB 120 can be configured to store a response sentence for each response type for the character.

The response-type determining unit 117 determines a response type from a determined speech type using the type conversion rule 118 corresponding to a preset character among the plurality of characters.

By using the type conversion rule 118 corresponding to the preset character among the plurality of characters, it is possible to exhibit characteristic concerning what kind of a behavior a system performs with respect to content (for example, arising, manifestation or arousing act, an intention, determination, or the like of an emotion and a subjective evaluation) read from an input speech sentence.

For example, a response type can be determined according to the type conversion rule 118 for each character such that the system performs a saddening "SADNESS" behavior or a surprising "SURPRISE" behavior with respect to an anger "NEG" of the user.

By creating, concerning the plurality of characters, the type conversion rule 118 as a type conversion rule for each character in this way, it is possible to return different response sentences to the same speech sentence and perform various behaviors for each character.

In this case, the response-sentence generating unit 119 generates a response sentence based on the response sentence DB 120 corresponding to a preset character among the plurality of characters and the response type determined by the response-type determining unit 117.

By using the response sentence for each response type concerning the set character, it is possible to exhibit, to the input speech sentence, characteristic such as "tone" as a behavior based on the response type determined using the type conversion rule 118 for the character.

For example, it is possible to generate, as a response speech of a response type "DEFAULT", a response sentence having, for example, a tone based on a polite expression such as "sou nandesune, naruhodo (really, indeed)" or a tone based on a close relationship such as "fuun, hee (hmm, well)".

By creating a response sentence for each response type with respect to each of the plurality of characters, it is possible to generate response sentences having different tones or the like with respect to the same speech sentence and perform various behaviors for each character.

In this case, the input unit 100 may receive an input of character setting information and pass the character setting information to a character switching unit (not illustrated), and the character switching unit may set a character based on the character setting information and pass the set character to the response-type determining unit 17 and the response-sentence generating unit 119.

The plurality of type conversion rules 118 and the plurality of response sentence DBs 120 do not always have to be associated in a one-to-one relation. For example, a combination of the type conversion rule 118 and the response sentence DB 120 in use may be switched by the character switching unit to change a character to be expressed.

That is, it is assumed that, as shown in FIG. 13, two type conversion rules 118 are prepared as "character A: short temper" and "character B: absent minded" and two response sentence DBs 120 are prepared a "character a: polite" and "character b: rough". Then, it is possible to express the characters using four patterns of combinations, that is, the characters A and a, the characters A and b, the characters B and a, and the characters B and b, without being limited to two patterns of a combination of the character A and a and a combination of the character B and b.

The character switching unit may be configured to be able to switch the set character to another character halfway when a predetermined condition is satisfied.

For example, the character switching unit may count the number of times of a type determined as a speech type or a response type and, when the number of times exceeds a threshold, change the character. When the number of times the response type is determined as anger "NEG" in one dialog is n or when the determination continues m times, the character switching unit changes a present character to a character touchier than the present character or a character for soothing the user and generates a response sentence. When it can be determined that the number of times the response type is determined as anger "NEG" in one dialog decreases, the character switching unit can return the character to the original character.

With such a configuration, it is possible to cause the character to behave as if an emotion is imparted to the character. By changing the thresholds (n and m described above) for each character, it is possible to further impart characteristics to the character.

In this specification, the program is installed in advance in the embodiment. However, the program can also be stored in a computer-readable recording medium and provided.

REFERENCE SIGNS LIST 10 response sentence generating device
100 input unit
110 computing unit
111 text analyzing unit
112 speech-content analyzing unit
113 substantive and independent word dictionary
114 declinable word dictionary
115 speech-target identifying unit
116 target dictionary
117 response-type determining unit
118 type conversion rule
119 response-sentence generating unit
120 response sentence database (DB)
130 output unit

The invention claimed is:

1. A computer-implemented method for generating a response to a speech input, the method comprising:
identifying a morpheme of one or more clauses of a speech input;
determining, based on the morpheme of the one or more clauses of the speech input, a speech type, wherein the speech type specifies a type of the speech input;
determining, based on the determined speech type, a response type and a type conversion rule, wherein the type conversion rule is one of a set of type conversion rules, wherein the set of type conversion rules prescribes, for each of a plurality of speech types, a rule for responding to each speech type using one of a plurality of response types;
automatically generating, based on the determined response type and a plurality of response sentences in a response sentence database, a response sentence, wherein the response sentence database stores the plurality of response sentences according to one of the plurality of response types; and
providing the response sentence as a response to the speech input.

2. The computer-implemented method of claim 1, wherein the speech type indicates, based on an emotion and a subjective evaluation related to the speech input, one of:
an awakening act,
a manifesting act,
an evoking act,
an intent, or
a decision, and
wherein the type conversion rule includes, for each of the plurality of speech types, one of response types, wherein the one of the response types indicates a type of responding to the speech input based on the one of the awakening act, the manifesting act, the evoking act, the intent, or the decision based on the emotion and the subjective evaluation related to the speech input.

3. The computer-implemented method of claim 1, the method further comprising:
extracting, based on the analyzed speech input, a predicate type and modality information of the speech input, wherein the predicate type indicates a type of an expression representing content of the speech input;
determining, based on the extracted predicate type and the modality information, the speech type indicating the type of the speech input; and
determining, based on the determined speech type and the type conversion rule, the rule for the response type for responding to the determined speech type, wherein the rule indicates the type of a response sentence for responding to the speech input with the determined speech type.

4. The computer-implemented method of claim 1, wherein the type conversion rule is associated with one or more characters, wherein the response sentence database includes one or more response sentence associated with one or more of the plurality of response types, and the method further comprising:
determining the response type, wherein the response type relates to the determined speech type according to the type conversion rule for one of the one or more characters; and
generating the response sentence according to the determined response type for the one of the one or more characters.

5. The computer-implemented method of claim 4, the method further comprising:
switching, based at least on a predetermined condition, the one of the one or more characters with another character, wherein the predetermined condition relates to the type conversion rule.

6. The computer-implemented method of claim 1, the method further comprising:
extracting, based on a result of the analyzed speech input, the predicate type indicating a type of an expression representing content of the speech input, the modality information of the speech input, and at least one of:
tense information,
polarity information, and
voice information indicating passiveness or activeness of the speech input; and determining, based on the predicate type, the modality information, and at least one of: the tense information, the polarity information, and the voice information, the speech type, wherein the speech type indicates the type of the speech input.

7. The computer-implemented method of claim 1, the method comprising:
determining, based on the identified morpheme information from the speech input, a case and a term of the speech input;
determining, based on the case and the term, a target label of the speech input, wherein the target label identifies a target entity of the speech input, and
determining, based on one or more of the predicate type of the speech input, the modality information of the speech input, and the target label of the speech input, the type translation rule.

8. A system a response to a speech input, the system comprises:
a processor; and
a memory storing computer-executable instructions that when executed by the processor cause the system to:
identify a morpheme of one or more clauses of a speech input;
determine, based on the morpheme of the one or more clauses of the speech input, a speech type, wherein the speech type specifies a type of the speech input;
determine, based on the determined speech type, a response type and a type conversion rule, wherein the type conversion rule is one of a set of type conversion rules, wherein the set of type conversion rules prescribes, for each of a plurality of speech types, a rule for responding to each speech type using one of a plurality of response types;
automatically generate, based on the determined response type and a plurality of response sentences in a response sentence database, a response sentence, wherein the response sentence database stores the plurality of response sentences according to one of the plurality of response types; and
provide the response sentence as a response to the speech input.

9. The system of claim 8, wherein the speech type indicates, based on an emotion and a subjective evaluation related to the speech input, one of:
an awakening act,
a manifesting act,
an evoking act,
an intent, or
a decision, and
wherein the type conversion rule includes, for each of the plurality of speech types, one of response types, wherein the one of the response types indicates a type of responding to the speech input based on the one of the awakening act, the manifesting act, the evoking act, the intent, or the decision based on the emotion and the subjective evaluation related to the speech input.

10. The system of claim 8, the computer-executable instructions when executed further causing the system to:
extract, based on the analyzed speech input, a predicate type and modality information of the speech input, wherein the predicate type indicates a type of an expression representing content of the speech input;
determine, based on the extracted predicate type and the modality information, the speech type indicating the type of the speech input; and determine, based on the determined speech type and the type conversion rule, the rule for the response type for responding to the determined speech type, wherein the rule indicates the type of a response sentence for responding to the speech input with the determined speech type.

11. The system of claim 8, wherein the type conversion rule is associated with one or more characters, wherein the response sentence database includes one or more response sentence associated with one or more of the plurality of response types, and the computer-executable instructions when executed further causing the system to:
determine the response type, wherein the response type relates to the determined speech type according to the type conversion rule for one of the one or more characters; and
generate the response sentence according to the determined response type for the one of the one or more characters.

12. The system of claim 11, the computer-executable instructions when executed further causing the system to:
switch, based at least on a predetermined condition, the one of the one or more characters with another character, wherein the predetermined condition relates to the type conversion rule.

13. The system of claim 8, the computer-executable instructions when executed further causing the system to:
extract, based on a result of the analyzed speech input, the predicate type indicating a type of an expression representing content of the speech input, the modality information of the speech input, and at least one of:
tense information,
polarity information, and
voice information indicating passiveness or activeness of the speech input; and
determine, based on the predicate type, the modality information, and at least one of: the tense information, the polarity information, and the voice information, the speech type, wherein the speech type indicates the type of the speech input.

14. The system of claim 8, the computer-executable instructions when executed further causing the system to:
determine, based on the identified morpheme information from the speech input, a case and a term of the speech input;
determine, based on the case and the term, a target label of the speech input, wherein the target label identifies a target entity of the speech input, and
determine, based on one or more of the predicate type of the speech input, the modality information of the speech input, and the target label of the speech input, the type translation rule.

15. A computer-readable non-transitory recording medium storing computer-executable instructions that when executed by a processor cause a computer system to:
identify a morpheme of one or more clauses of a speech input;
determine, based on the morpheme of the one or more clauses of the speech input, a speech type, wherein the speech type specifies a type of the speech input;
determine, based on the determined speech type, a response type and a type conversion rule, wherein the type conversion rule is one of a set of type conversion rules, wherein the set of type conversion rules prescribes, for each of a plurality of speech types, a rule for responding to each speech type using one of a plurality of response types;

automatically generate, based on the determined response type and a plurality of response sentences in a response sentence database, a response sentence, wherein the response sentence database stores the plurality of response sentences according to one of the plurality of response types; and provide the response sentence as a response to the speech input.

16. The computer-readable non-transitory recording medium of claim 15, wherein the speech type indicates, based on an emotion and a subjective evaluation related to the speech input, one of:

an awakening act, a manifesting act, an evoking act, an intent, or a decision, and wherein the type conversion rule includes, for each of the plurality of speech types, one of response types, wherein the one of the response types indicates a type of responding to the speech input based on the one of the awakening act, the manifesting act, the evoking act, the intent, or the decision based on the emotion and the subjective evaluation related to the speech input.

17. The computer-readable non-transitory recording medium of claim 15, the computer-executable instructions when executed further causing the system to:

extract, based on the analyzed speech input, a predicate type and modality information of the speech input, wherein the predicate type indicates a type of an expression representing content of the speech input;

determine, based on the extracted predicate type and the modality information, the speech type indicating the type of the speech input; and determine, based on the determined speech type and the type conversion rule, the rule for the response type for responding to the determined speech type, wherein the rule indicates the type of a response sentence for responding to the speech input with the determined speech type.

18. The computer-readable non-transitory recording medium of claim 15, wherein the type conversion rule is associated with one or more characters, wherein the response sentence database includes one or more response sentence associated with one or more of the plurality of response types, and the computer-executable instructions when executed further causing the system to:

determine the response type, wherein the response type relates to the determined speech type according to the type conversion rule for one of the one or more characters; and generate the response sentence according to the determined response type for the one of the one or more characters.

19. The computer-readable non-transitory recording medium of claim 15, the computer-executable instructions when executed further causing the system to:

switch, based at least on a predetermined condition, the one of the one or more characters with another character, wherein the predetermined condition relates to the type conversion rule.

20. The computer-readable non-transitory recording medium of claim 15, the computer-executable instructions when executed further causing the system to:

extract, based on a result of the analyzed speech input, the predicate type indicating a type of an expression representing content of the speech input, the modality information of the speech input, and at least one of:

tense information, polarity information, and voice information indicating passiveness or activeness of the speech input; and determine, based on the predicate type, the modality information, and at least one of: the tense information, the polarity information, and the voice information, the speech type, wherein the speech type indicates the type of the speech input.

* * * * *